US005364596A

United States Patent [19]

Magnussen, Jr. et al.

[11] Patent Number: 5,364,596

[45] Date of Patent: Nov. 15, 1994

[54] MANUAL PIPETTE WITH PLUNGER VELOCITY GOVERNOR, HOME POSITION LATCH AND TRIGGER RELEASE

[75] Inventors: Haakon T. Magnussen, Jr., Orinda; William D. Homberg, Oakland; Kenneth Rainin, Piedmont, all of Calif.

[73] Assignee: Rainin Instrument Co., Inc., Emeryville, Calif.

[21] Appl. No.: 983,883

[22] Filed: Dec. 1, 1992

[51] Int. Cl.[5] .......................... B01L 3/02; G01N 1/14

[52] U.S. Cl. .................................... 422/100; 422/103; 73/863.03; 73/864.13; 73/864.14; 73/864.15; 73/864.16; 73/864.18

[58] Field of Search ............... 422/100, 101, 104, 103; 73/864.13, 864.14, 864.15, 864.18, 864.16, 863.01-863.03; 436/49

[56] References Cited

U.S. PATENT DOCUMENTS

| | | | |
|---|---|---|---|
| 3,913,636 | 10/1975 | Mochida | 422/100 |
| 4,041,764 | 8/1977 | Sabloewski et al. | 73/864.18 |
| 4,257,267 | 3/1981 | Parsons | 73/864.18 |
| 4,268,481 | 5/1981 | Suovaniemi et al. | 73/864.18 |
| 4,304,138 | 12/1981 | Tervamaki | 73/864.17 |
| 4,406,170 | 9/1983 | Kuhn | 73/864.16 |
| 4,442,722 | 4/1984 | Meyer | 73/864.18 |
| 4,763,535 | 8/1988 | Rainin et al. | 422/100 |
| 4,794,085 | 12/1988 | Jessop et al. | 73/863.01 |
| 4,909,991 | 3/1990 | Oshikubo | 422/100 |
| 5,111,703 | 4/1992 | Allen | 73/864.16 |

FOREIGN PATENT DOCUMENTS

| | | | |
|---|---|---|---|
| 2048712 | 12/1980 | United Kingdom | 422/100 |
| 2243411 | 10/1991 | United Kingdom | 73/863.01 |
| 8404056 | 10/1984 | WIPO | 422/100 |
| 9116976 | 11/1991 | WIPO | 422/100 |

*Primary Examiner*—James C. Housel
*Assistant Examiner*—Milton I. Cano
*Attorney, Agent, or Firm*—Robert R. Meads

[57] ABSTRACT

A manual pipette including user controllable latch and trigger mechanisms for releasably locking the plunger of the pipette in a "home" position ready for immersion of the pipette tip in a fluid to be drawn into the tip and further including a user controllable velocity governor for regulating the rate of plunger return from the "home" position to a first or upper stop position in drawing the fluid into the tip.

19 Claims, 8 Drawing Sheets

MANUAL PIPETTE WITH PLUNGER VELOCITY GOVERNOR, HOME POSITION LATCH AND TRIGGER RELEASE

BACKGROUND

The present invention relates to manual pipettes and more particularly to an improved manual pipette including a velocity governor, "home" position latch and trigger release.

Certain commercially available single channel manual pipettes are illustrated and described in U.S. Pat. Nos. 3,827,305 and 4,909,991 by way of example. Each such pipette includes an elongated hand holdable pipette body housing an upwardly spring biased plunger unit. The plunger unit is supported for axial movement in the pipette body between a first or upper stop position in which an end portion of the plunger extends from an upper end of the pipette body. A pipette user grips the pipette body with his or her thumb over the exposed end portion of the plunger. Downward thumb action on the plunger moves the plunger downward from its upper stop position against the upward bias of a return spring to a second or lower stop position at which all fluid is expelled from a tip secured to the pipette. Between the upper and lower stop positions is a "home" position. The "home" position is defined by a "soft" stop.

In the commercially available pipettes described in the foregoing patents, the "soft" stop is defined by a second relatively stiff spring mechanism within the pipette body which is activated when the plunger unit reaches the "home" position. As the pipette user depresses the plunger unit by pressing downwardly with his thumb on the exposed end of the plunger, he can "feel" the activation of the second spring assembly opposing further downward movement of the plunger unit. U.S. Pat. No. 4,041,764, describes a magnetic detent which is engaged between an upper stop and a "home" position for a pipette piston and is disengaged by the pipette user exerting an increased axial force on a push button when it is desired to move the piston beyond the "home" position against the force of a return spring. German patent applications 239 539 A1 and 239 540 A1 describe pipettes with magnetic detents at lower stops which are overcome and disengaged by action of a return spring. In all such pipettes, the pipette user is required to continuously apply a steady downward force with his thumb to maintain the pipette plunger in its "home" position ready for emersion of a tip of the pipette into a fluid to be drawn into the tip by controlled upward movement of the plunger from the "home" position to the upper stop position.

Most commercially available multi-channel manual pipettes function in substantially the same manner as the single channel manual pipettes except that they contain multiple liquid ends each having a separate piston driven in unison from a common spring biased plunger unit. Other commercially available multi-channel manual pipettes such as the Costar Octapette and 12-Pette multichannel pipettes comprise a pistol grip structure for hand gripping by a user with his forefinger extending forward to engage and wrap partially around a spring biased actuator. In the Octapette, rearward movement of the spring biased actuator is translated into a vertical movement of a plunger unit common to the pistons in the liquid ends of the multi-channel pipette. In both types of multi-channel manual pipettes, the "home" position for the plunger unit is defined by a "soft" stop as in the previously described single channel manual pipettes and a steady force on the actuator is required to maintain the plunger unit at a "home" position.

With such conventional manual pipettes, in order obtain repeatability of operation, it is mandatory that the user return the plunger unit to its "home" position at start of each pipette operation and hold the pipette in "home" position while he immerses the tip in the fluid to be drawn into the pipette. He must then manually control the rate of return of the plunger unit to the first or upper stop position in a repeatable manner for each pipette operation in order that the same desired volume of fluid will be drawn into the pipette tips during each repeated operation. This places substantial physical and mental strain upon the pipette user over the course of a series of pipette operations wherein repeatability of operation is essential. In extreme cases the physical hand and wrist strain associated with extensive and prolonged manual pipette operation can contribute to or produce carpel tunnel syndrome.

While a pipette having a controlled rate of return has previously been developed for the assignee of the present invention and described in U.S. Pat. No. 4,763,535 and while a pipette having an attenuated rate of upward piston movement as it leaves a "home" position is described in German Offenlegungsschrift DE 39 03 241A1, there remains a substantial need for an improved manual pipette which is simple in design and operation and which does not present either a physical or mental strain to a pipette user to maintain the pipette in its "home" position and manually control the rate of plunger return to ensure repeatability of pipette operation. The present invention satisfies that need.

SUMMARY OF THE INVENTION

Like prior conventional manual pipettes, the present invention comprises a hand holdable pipette body having a return spring biased plunger unit supported therein for axial movement from a first or upper stop position. As with prior manual pipettes, a pipette user holding the pipette of the present invention presses on a plunger control to move the plunger unit from the first stop position against the return spring bias to a second or lower stop position wherein all fluid contained in a pipette tip is expelled from the tip. However, rather than requiring the user to apply a steady and controlled force to maintain the plunger unit in its "home" position against a strong spring defining a "soft" stop, the pipette of the present invention includes a latch mechanism which releasably engages and holds the plunger against such spring bias in a "home" position. In fact, the strong spring bias of a secondary spring may be eliminated or substantially reduced in the present invention to further reduce the downward piston force which a pipette user must generate to expel all residual fluid from the tip of the pipette. Finally, in the present invention a user may manually release the latch mechanism whereby the return spring bias causes the plunger to automatically return to its first stop position. Preferably such manual release is provided by a user operable trigger mechanism. Also, the rate of return of the piston from the "home" position to the first stop position may be controlled by a velocity governor included within the pipette body.

Thus, in operation of the pipette of the present invention, a pipette user holds the pipette body in one hand. The user then presses on a plunger control to move the plunger unit to the "home" position where the latch mechanism engages to hold the plunger unit at the desired "home" position. The user then places the tip of the pipette in a fluid and releases the latch to allow the plunger unit to return to its first stop position under velocity control of the governor. When it is desired to dispense the fluid, the user moves the pipette over the desired receptacle and presses on the piston control to move the plunger from its first stop position, through the "home" position to the second or lower stop position at which all fluid in the pipette tip is expelled. When it is desired to use the pipette in the mixing of liquids, user operable means are included for selectively over riding the latch to allow the user to mix liquids by repeated up and down motion of the plunger without engagement of the latch.

By providing a controlled, releasable latching of the plunger in its "home" position, the pipette of the present invention substantially reduces user fatigue and hand strain and eliminates the possibility of a user starting aspiration operation of the pipette at other than the required "home" position. Further, by governing the rate of pipette aspiration, the pipette of the present invention substantially reduces user variability of aspiration rates, minimizes liquid losses due to splashing and prevents contamination of the pipette's liquid end, piston and seal.

BRIEF DESCRIPTION OF DRAWINGS

FIG. 1 illustrates the pipette with the plunger moving from a first or upper stop position to a "home" position. FIG. 2 illustrates the pipette in the "home" position. FIG. 3 illustrates the pipette at the "home" position with a trigger mechanism actuated to release the latch included in the pipette. FIG. 4 illustrates the pipette at the first or upper stop position after release of the latch. FIG. 5 illustrates the pipette at a second or lower stop position and FIG. 6 illustrates the pipette at the "home" position following return from the second or lower stop position.

DETAILED DESCRIPTION OF INVENTION

Figure 1:
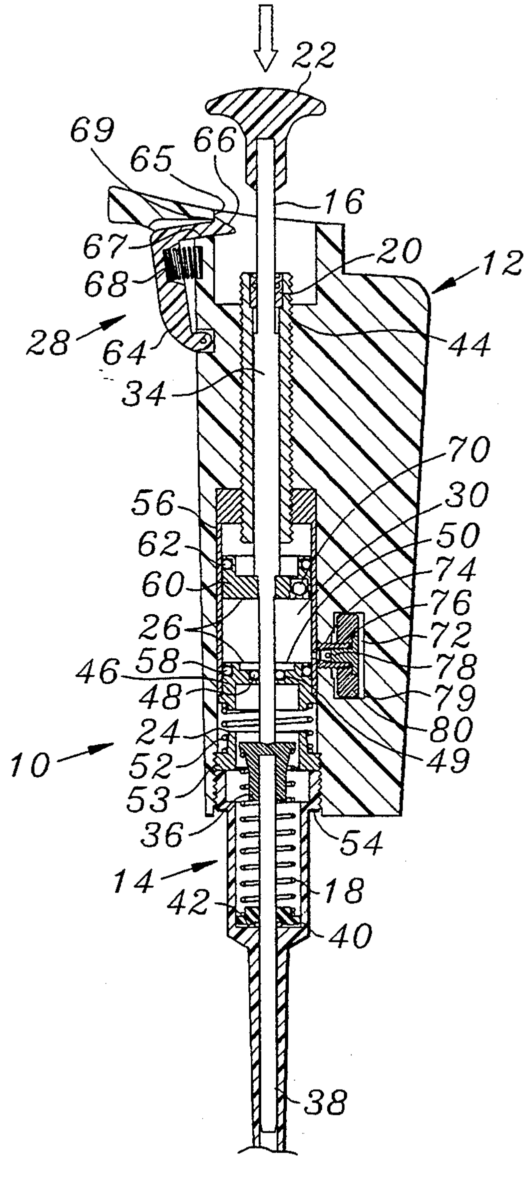
FIGS. 1 through 6 show a preferred form of the manual pipette of the present invention in various stages of operation.

Referring to FIGS. 1 through 7, a preferred form of the manual pipette of the present invention is illustrated and represented by the numeral 10. The pipette 10 comprise a pipette body 12 preferably formed from a plastic material. The body 12 is axially elongated and shaped to be hand holdable with a liquid end 14 contiguous with an extending axially from a lower end of the body 12 to receive a pipette tip (not shown). A plunger unit 16 upwardly biased by a spring 18 is supported for axial movement within the pipette body 12 between an upper stop 20 and a lower stop 24. At the upper stop, an end portion of the plunger unit 16 extends from an upper end of the pipette body 12 and receives a control knob 22. The body 12 and control knob 22 are so shaped that when a pipette user grips the body 12 his thumb extends over the top of the control knob such that thumb action of the user will exert a downward force on the plunger unit 16 to move the plunger downward from the upper stop 20 against the action of the spring 18 to the lower stop 24.

Within the body 12 is a latch mechanism 26 for releasably holding the plunger unit 16 in a "home" position against the continuous upward spring bias of the spring 18. The "home" position is the axial position of the plunger unit 16 in the pipette body 12 where the pipette 10 is ready for its tip end to be immersed in a fluid for pick up by the pipette and subsequent dispensing into a receptacle. It is also the return position for the plunger unit 16 during repeated pipette operations in drawing fluid into and dispensing fluid from the tip.

The latch mechanism 26 is releasable in response to user operation of a trigger mechanism 28 or by the user lifting up on the control knob 22 to disengage the latch. A release of the latch by the trigger or upward movement of the plunger unit 16 allows the plunger unit to return from the "home" position to the upper stop position under influence of the spring 18.

The rate of movement of the plunger unit 16 from the "home" position to the upper stop position is under selective control of a velocity governor 30. Accordingly, the rate of upward travel of the piston may be regulated as desired to different uniform rates to insure consistent and repeatable rates of plunger unit movement in drawing or aspirating liquid into the tip secured to the liquid end 14 of the pipette 10.

Further, with the latch mechanism 26, the pipette 10 may be maintained in the "home" position for as long as desired without the pipette user exerting any force on the plunger unit to retain the plunger unit in its "home" position. This substantially eliminates the fatigue and strain on the pipette user associated with prior manual pipettes. Further, since the pipette of the present invention always begins its aspiration of liquids at the "home" position, the pipette 10 insures repeatability of results and operation when compared with prior manual pipettes.

Figure 3:
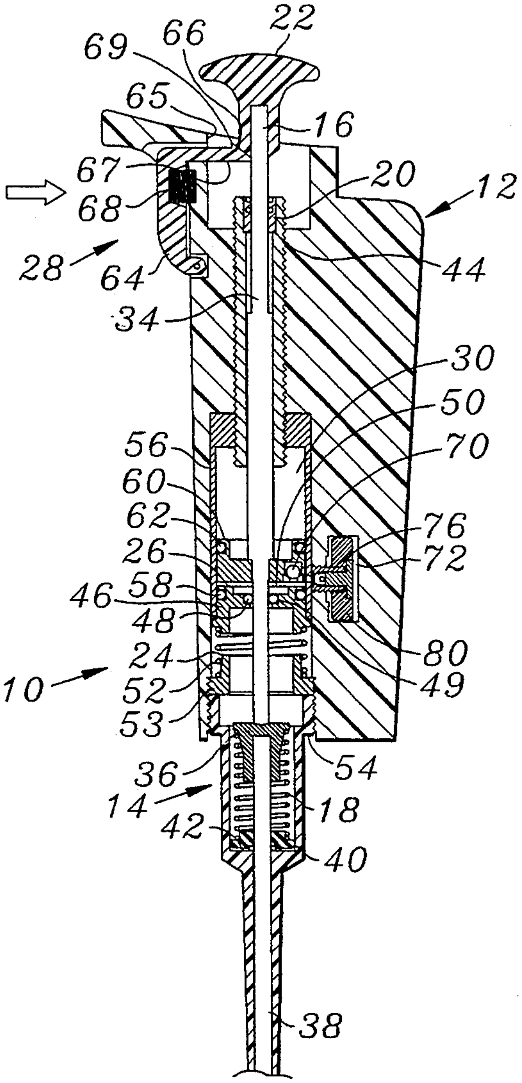
Figure 4:
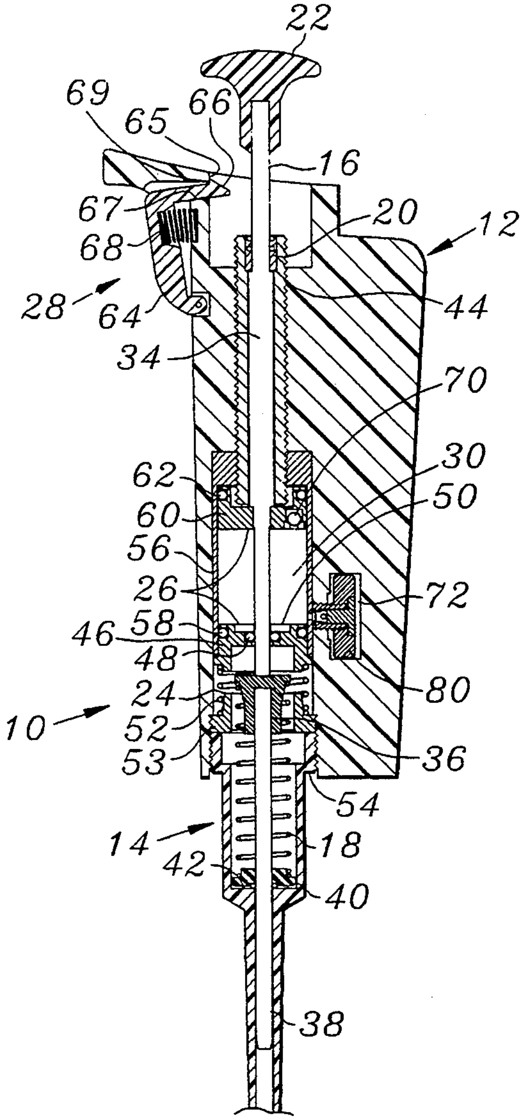
Figure 5:
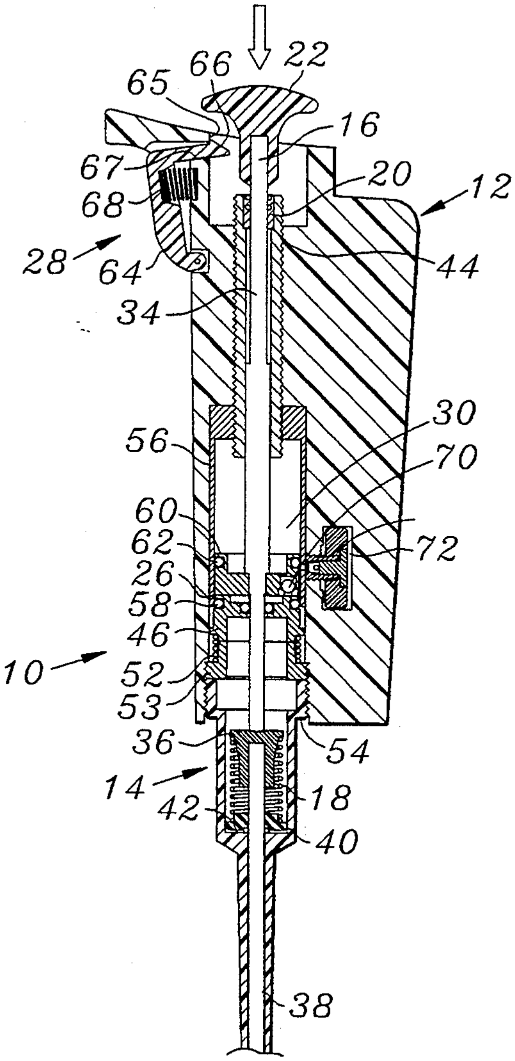
Figure 6:
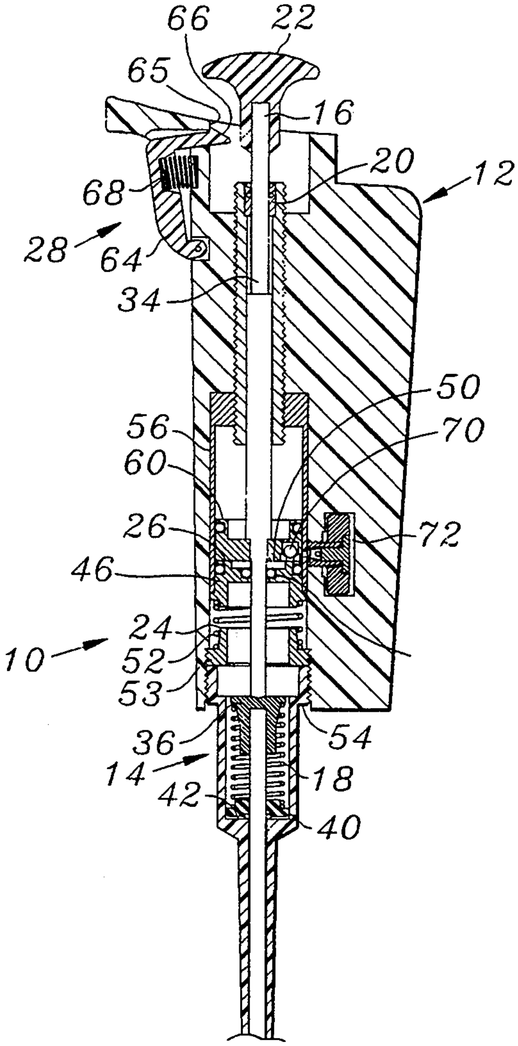

When it is desired to utilize the pipette for mixing liquids, the user may simply hold the trigger mechanism 28 in an actuated condition as shown in FIG. 3. Alternatively, the user may actuate an override or lockout mechanism such as mechanism 32 shown in FIGS. 8*a* and 8*b* to prevent actuation of the latch mechanism 26. This allows the user by repeated up and down thumb action on the control knob 22, to cyclically move the plunger unit 16 up and down to affect a mixing of liquids within the tip of the pipette and a liquid reservoir.

Figure 7:
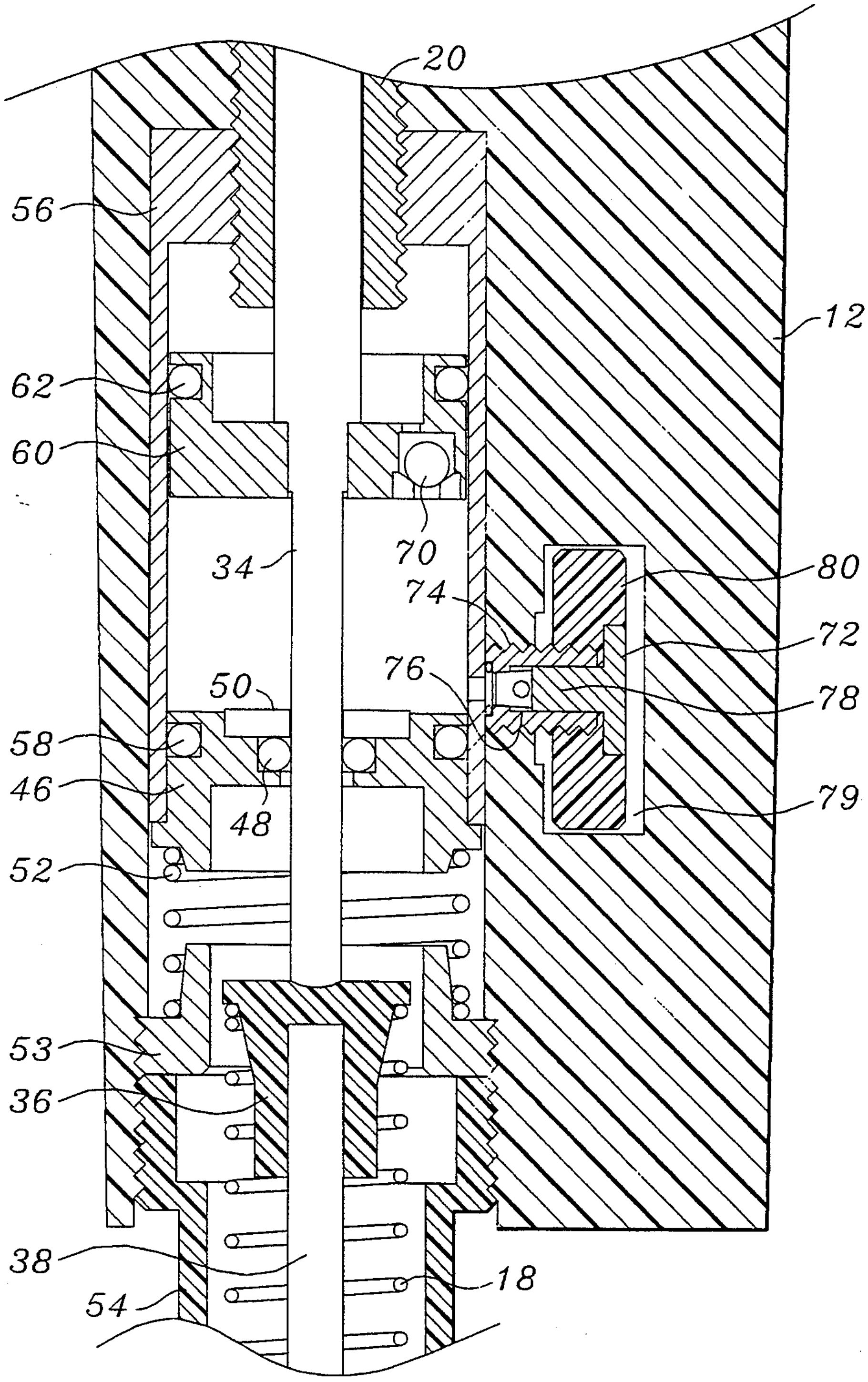
FIG. 7 is an enlarged cross sectional view of a central portion of the pipette illustrated in FIG. 1 more clearly showing a preferred form of the velocity governor and launch included in the pipette of FIG. 1.

Referring now more specifically to FIG. 1 and FIG. 7, the plunger unit 16 comprises an axially elongated plunger 34 terminating at its upper end in the control knob 22 and at its lower end in a piston return 36. The piston return is secured to the upper end of a piston 38 moveable axially with the plunger 34 within the liquid end 14. The spring 18 surrounds the piston 38 with one end bearing on an annular shoulder of the piston return 36 and an opposite end bearing on a seal retainer 40 seated on a shoulder 42 at an end of the liquid end 14. Thus confined, the spring 18 continuously exerts an upward force on the piston 38, piston return 36 and hence the plunger 34 to continuously urge the plunger unit 16 toward the upper stop 20, the upper stop being defined by an axially adjustable shoulder 44 within the body 12 of the pipette.

As illustrated most clearly in FIG. 7, the "home" position for the plunger unit 16 is defined by a bottom stop member 46. The stop 46 is generally cylindrical in shape having an inwardly stepped inner surface around a central opening for receiving a lower end of the plunger 34. Within the bottom stop 46, the plunger 34 passes through an O-ring fluid seal 48 captured in a compartment 49. The compartment is defined by an annular inner step in the bottom stop 46 and a top plate which in the preferred form of the pipette comprises a ring-shaped magnet 50 seated in a top relief in the bottom stop. A coil spring 52, which may be weak relative to spring 18, bears on a bottom annular surface of the bottom stop 46 and against an annular shoulder of a spring retainer 53 resting on an upper end of a liquid end shaft 54 and having an upper annular surface defining the lower stop 24. Thus positioned, the spring 52 continuously urges the bottom stop 46 against a lower annular surface of a cylinder 56 seated coaxially within the pipette body 12 to define the "home" position for the bottom stop and, as will be described in detail hereafter, for the plunger unit 16 as well. Preferably, in the "home" position, the bottom stop member 46 extends slightly into the bottom of the cylinder 56 with an O-ring seal 58 captured in an outer annular recess and bearing on an inner surface of the cylinder to create a fluid tight seal therebetween.

Figure 2:
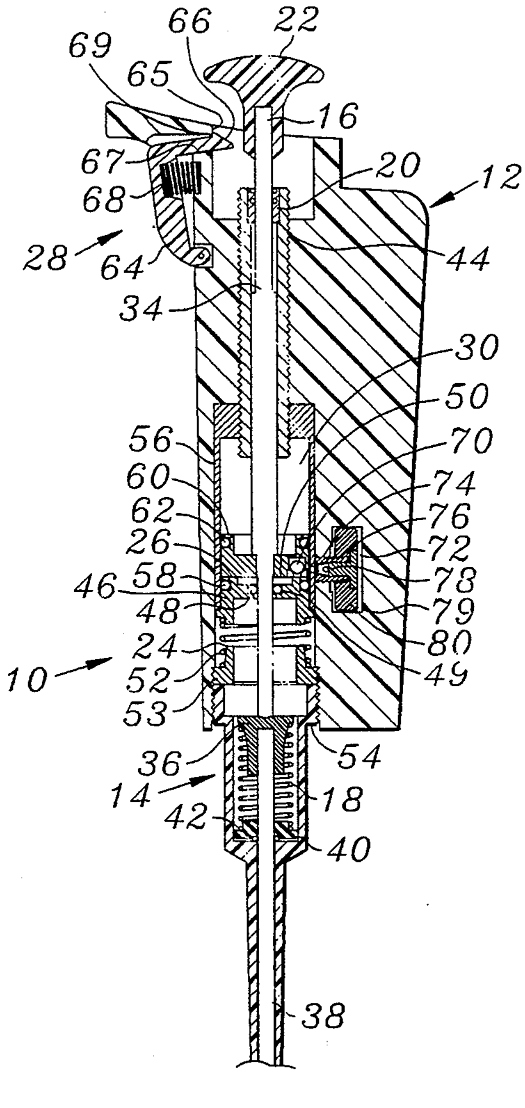

With the pipette 10 as thus far described, and with reference to FIGS. 1 through 7, a user of the pipette pushing downward by thumb action on the control knob 22 moves the plunger 34, piston return 36 and piston 38 downward until a lateral extension from the plunger 34 (e.g. dashpot piston 60) engages the bottom stop member 46 defining the "home" position for the pipette (See FIG. 2). Further downward movement of the plunger 34 in response to the thumb action of the user compresses the relatively small spring 52 while the plunger and piston move further downward until the bottom stop 46 engages a top of the spring retainer 53 to define the lower stop position for the plunger 16 (See FIG. 5). In normal operation of the pipette 10, the movement of the plunger from the "home" position to the lower stop position effects "blowout" of all residual fluid in the pipette tip secured to a lower end of the liquid end 14. Upon release of the control knob, the plunger unit returns towards the "home" position under the influence of the springs 18 and 52 (See FIG. 6).

In prior conventional manual pipettes, the plunger unit 16 would continue its upper travel to the upper stop position unless controlled or held in the "home" position by thumb action of the pipette user. In the present invention however, the latch mechanism 26 effects a retention of the plunger unit in the "home" position against the upward force of the spring 18 (See FIG. 6). In this regard, a preferred form of the latch mechanism comprises a magnetic latch including the magnet 50 and a ferromagnetic dashpot piston 60. The dashpot piston 60 is secured to the plunger 34 to ride up and down within the cylinder 56. An O-ring 62 seamed in an outer annular surface of the dashpot piston 60 rides on the inner cylindrical surface of the cylinder 56 to affect a seal between the dashpot piston 60 and the cylinder during operation of the pipette 10—a complete seal for the dashpot being provided by the O-ring seals 48, 58 and 62. As the plunger 34 moves downward in response thumb action of the pipette user, the dashpot piston engages the magnet 50 and releasably locks thereto to secure the plunger 34 and piston 38 in the "home" position. The pipette user can release his thumb while the pipette remains in its "home" position.

To selectively release the magnetic latch defined by the dashpot piston 60 and magnet 50, the preferred pipette of the present invention comprises the trigger assembly 28 illustrated most clearly in FIGS. 1 though 6. The trigger mechanism 28 comprises a rocker arm 64 hinged at a lower end to an outside of the pipette body 12. The arm 64 extends vertically upward along the body toward a top thereof with a nose portion 66 extending through a side opening 67 in a top piece of the body 12 in the direction of the plunger 34 and control knob 22. The arm 64 is normally biased away from the plunger 34 by spring 68 extending between the body 12 and a side of the arm 64 to urge a shoulder 69 on the nose 66 against a stop 65 defined by an inside surface of the body top piece adjacent the opening 67. When it is desired to actuate the trigger mechanism 28 and affect a release of the latch 26, the pipette user simply presses inward on the outer surface of the lever arm 64 with his index finger to compress the spring 68 and move the nose portion 66 against a side of the control knob 22 as illustrated most clearly in FIG. 3. This affects an axial movement of the plunger 34 in an upward direction sufficient to separate the dashpot piston 60 from the magnet 50 and allow the spring 18 to move the piston 38, piston return 36 and plunger 34 in an upward direction to the upper stop position for the pipette 10. Alternatively, the user may press upward on the control knob 22 to affect a manual release of the magnetic latch allowing the spring 18 to affect a return of the piston to the upper stop position.

The rate of upward movement of the plunger unit 16 including the dashpot piston 60 is regulated by the velocity governor 30 most clearly shown in FIG. 7. In the illustrated embodiment, the velocity governor 30 comprises the combination of the dashpot piston 60, cylinder 56 and bottom stop 46. These elements combine to define a closed chamber. Air inlet and outlet from the closed chamber is affected through a check valve 70 and a needle valve 72. The check valve 70 is located in the dashpot piston 60 and is preferably formed by a conventional ball or flap one-way valve over a hole extending through the dashpot piston. With downward movement of the dashpot piston, the one-way valve opens to allow air to escape from the closed chamber. The needle valve 72 is located in a side of the body 12 just above the bottom stop 46. It comprises a side opening 74 through the body 12 and the cylinder 56 into the closed chamber. A valve seat 76 is threaded into the opening 74 in the body 12 and receives a needle valve 78 secured to a knob 80 threaded to the outside of the valve seat. An opening 79 in the body 12 exposes the knob 80 to the pipette user. Thus, by the user's turning of the knob 80, the restriction through the needle valve is controlled to regulate the flow of air from atmosphere into the closed chamber defined by the dashpot piston, bottom stop, and cylinder. Such restricted airflow occurs as the dashpot piston returns to an upper position within the cylinder to affect a regulation or governing of the rate of upward movement of the plunger 34 from the "home" position to the upper stop position. By controlling the needle valve, the rate of upward movement is regulated and may be maintained from pipette operation to pipette operation to further insure accurate repeatability of the results of operation of the pipette 10.

Figure 8A:
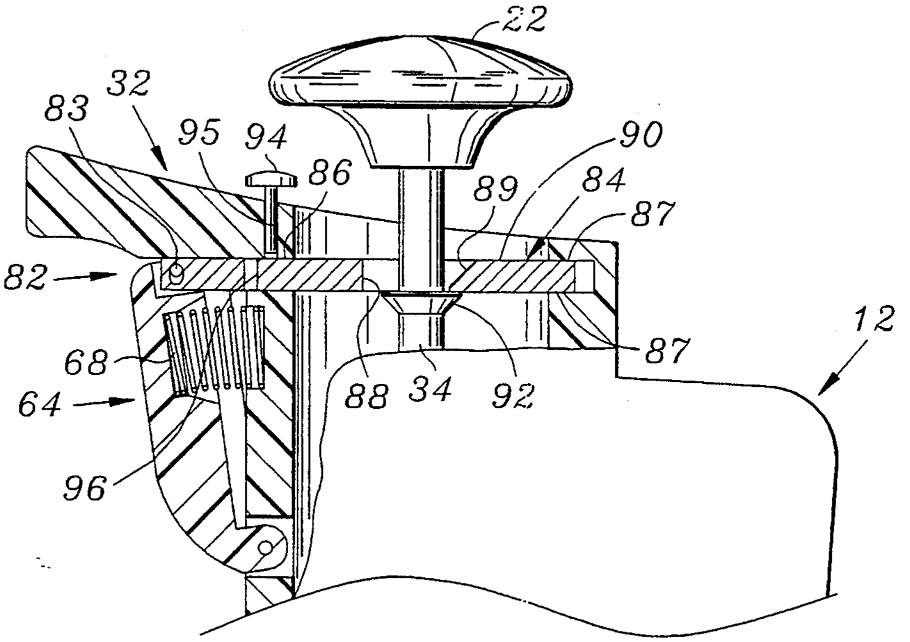
FIGS. 8*a* through 8*f* show alternative forms of latch and trigger mechanisms which may be included in the manual pipette of the present invention and which include means for overriding the latch when it is desired to use the pipette in the mixing of liquids.
Figure 8B:
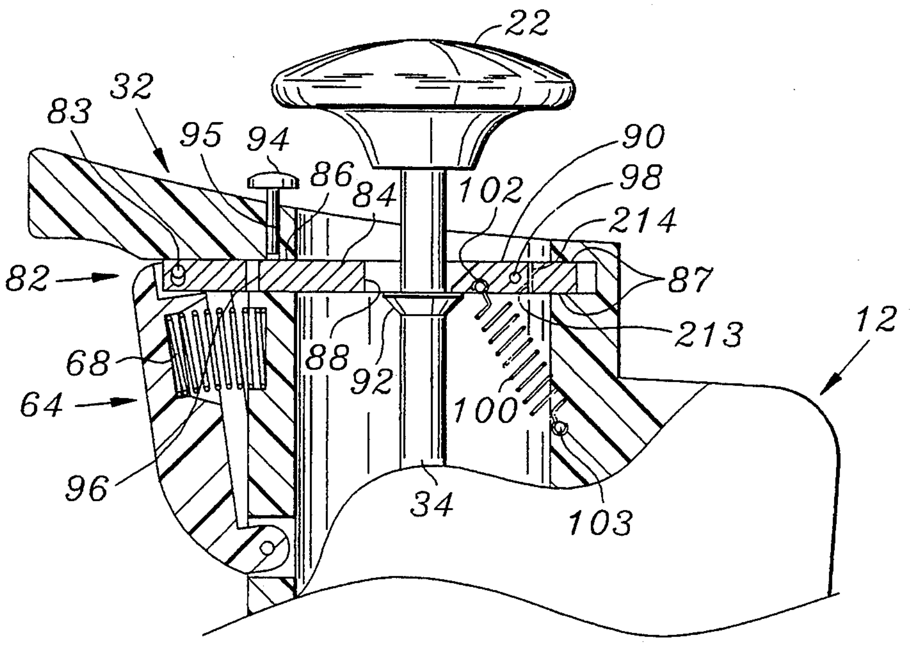

Alternative forms of the latch and trigger mechanism for the pipette 10 are diagrammatically represented in FIGS. 8*a*, 8*b*, 8*c*, 8*d*, 8*e* and 8*f*. As represented in FIGS. 8*a* and 8*b*, the latch and trigger mechanisms may comprise a slider plate and catch mechanism 82 including a slider plate 84 connected by a pivot 83 to the trigger arm 64 to extend horizontally through a guide opening 86 in one side of the top piece of the pipette body and into a guide slot 87 in an opposite side of the top piece. An opening 88 in the slider plate 84 receives the plunger 34 and includes and outwardly and upwardly inclined side 89 defining a wedge-shaped cam or latch member 90. The slider plate 84 is spring biased outwardly away from the side of the pipette body 12 by the spring member 68 of the trigger mechanism. Such action of the spring 68 urges the latch member 90 against a side of the plunger 34 riding in an opening 88 to define a limit for the outward travel of the slider plate. Such lateral movement of the latch is guided by the guide opening 86 and guide slot 87. As illustrated in FIG. 8*a*, the wedge-shaped cam or latch member 90 is adapted to an inverted cone-shaped collar or catch 92 secured to the plunger 34. As the plunger moves downward from the upper stop position toward the lower stop position, the catch 92 engages the cam surface of the latch 90 to urge the slider plate inward to the right in FIG. 8*a* as the cone rides over the cam surface. At the end of the cam surface, the spring 68 causes a return of the slider plate to the left and the latch member 90 to engage the top of the cone to define the "home" position for the plunger 34. When it is desired to release the plunger from the "home" position and to return to the upper stop position, the user simply pushes inward on the trigger arm 64 moving the slider plate 84 to the right and releasing the latch member 90 from the catch 92. This allows the spring 18 to affect a return of the plunger unit to the upper stop position as previously described.

As described with respect to the pipette of FIGS. 1–7, the second spring 52 may be relatively weak to thereby reduce the downward force which must be generated by the pipette user to move the piston unit 16 from the "home" position to the lower stop position. In the embodiment of FIG. 8*a* however, the spring 52 may be eliminated entirely such that the pipette user only needs to overcome the return spring 18 in moving the piston unit 16 from the "home" to lower stop positions. Such an embodiment would not need the dashpot latch, spring 52 or spring retainer 53. The piston return 36 would function as a bottom stop engaging a shoulder secured to or on the body 12 equivalent to the spring retainer 53 or top of the liquid end 14 within the body 12. As described, the latch mechanism defined by the slider plate and catch mechanism 82 performs its releasable latch function at the "home" position of the piston unit 16 without the need of the latching feature of the dashpot piston 60 and magnet 50.

Further, the slider plate and catch mechanism 82 provide means 32 for over riding the latch mechanism defined thereby as when it is desired to convert the pipette to a standard manual pipette. In this regard, the mechanism 82 includes a lockout pin 94 mounted for vertical sliding movement in a hole 95 in the top piece of the body 12. The slider plate 84 includes a hole 96. When the slider plate 84 is moved to the right under control of the trigger arm 64 to release the catch mechanism 82, the holes 95 and 96 will align allowing the pin 94 to be pressed down into the hole 96 thereby securing the catch mechanism in a released condition. In such a position, the piston unit 16 is free to move up and down in response to cyclic downward forces on the control knob 22 to effect a mixing of liquids in the tip of the pipette and a container of liquid.

The alternative and flexible catch form of the latch and trigger mechanism illustrated in FIG. 8*b* resembles that of FIG. 8*a* except that the latch member 90 is separate from the slider plate 84 and is hinged by pivot 98 to the slider plate 84 within the opening 88 to swing in a upward direction against a spring 100. The spring 100 is connected at opposite ends by pins 102 and 103 to the latch member 90 and pipette body 12 respectively. Thus connected, the spring 100 normally urges the catch member 90 to swing downward about pivot 98, until a lower right corner 213 of catch member 90 touches an edge 214 of opening 88. As the plunger moves downward from the upper stop position toward the lower stop position, the catch 92 engages the cam surface of the latch member 90 to urge the slider plate inward to the right as the cone rides over the cam surface. At the end of the cam surface, the spring 68 causes a return of the slider plate to the left and the latch member 90 to engage the top of the cone. The embodiment of FIG. 8*b* differs from 8*a*, because the latch member 90 does not define the "home" position for the plunger 34. Instead, the spring 100 causes the latch member 90 to hold the plunger 34 at the traditional "soft" stop, because the spring 100 is designed to be strong enough to compress the return spring, but not strong enough to compress the secondary spring.

The embodiment of FIG. 8*b* has a potential advantage over that of FIG. 8*a*, because any wear between the top of the catch 92 and the latch member 90 will not affect the "home" position. In the embodiment of FIG. 8*a*, the materials for the catch 92 and the latch member 90 should be chosen carefully, as any wear between the two will cause the "home" position to move upward.

Figure 8C:
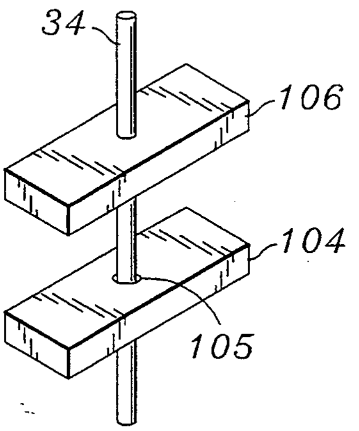
Figure 8D:
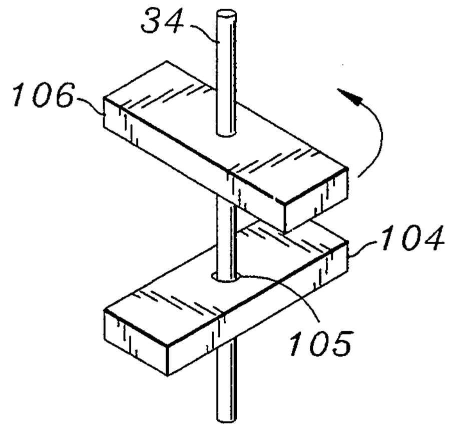

FIGS. 8*c*, 8*d*, 8*e* and 8*f* depict latch mechanisms which may be actuated and/or overridden by a manual turning of the control knob 22. In FIGS. 8*c* and 8*d*, the latch mechanism comprises a bar magnet 104 having an opening 105 for passing the plunger 34. The magnet 104 may be secured to the bottom stop member 46. Positioned above the magnet 104 and secured to the plunger 34 for movement therewith is a bar 106 of ferromagnetic material. When the bar 106 approaches the magnet 104 it is attracted thereto if it is aligned therewith as shown in FIG. 8c. The bar 106 and magnet 104 will releasably lock together when the plunger 34 reaches its "home" position in response to the upward force of the return spring 18 on the plunger as previously described. When it is desired to release the latch mechanism shown in FIG. 8*c*, the user simply turns the control knob 22 to turn the plunger 34. The bar 106 is likewise turned to the position shown in FIG. 8*d* out of the magnet field of the magnet 104 to effect a release of the latch and a controlled return of the plunger to its upper stop position under influence of spring 18 as previously described.

Figure 8E:
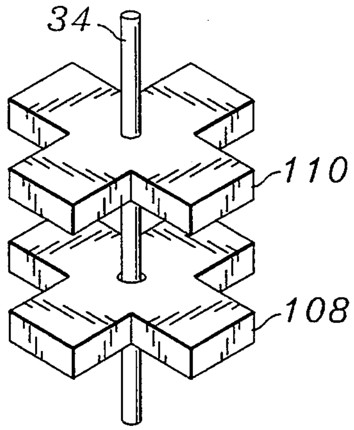
Figure 8F:
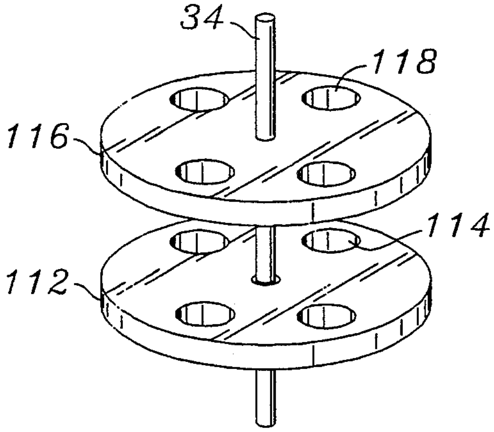

Alternate forms of latch mechanisms including stationary magnets and turnable ferromagnetic members are shown in FIGS. 8*e* and 8*f*. In FIG. 8*e*, a cross-shaped magnet 108 is secured as to the bottom stop member 46 and effects a releasable locking to a cross-shaped ferromagnetic member 110 carried by the plunger 34 in the same manner as described for the latch of FIGS. 8*c* and 8*e*.

In FIG. 8*f*, a stationary disc 112 carries a plurality of circumferentially spaced magnets 114 for releasable locking to a disc 116 secured to the plunger 34 and carrying a matching number of pieces 118 of ferromagnetic material. When the discs 112 and 116 are aligned as shown in FIG. 8*f*, the discs will attract and releasably lock together as the plunger 34 move the disc 116 toward the disc 112. A release of the discs is effected by a turning of the disc 116 relative to the disc 112 to disconnect the magnets 114 from the ferromagnetic pieces 118.

Figure 9:
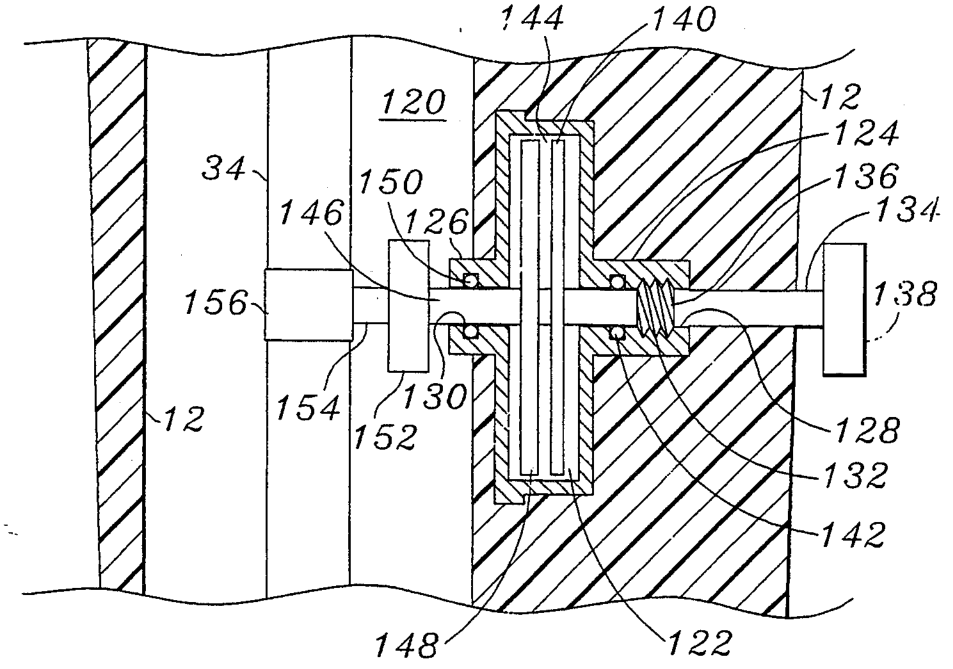
FIG. 9 illustrates an alternate form of the velocity governor comprising an adjustable viscous fluid dampener.
Figure 10:
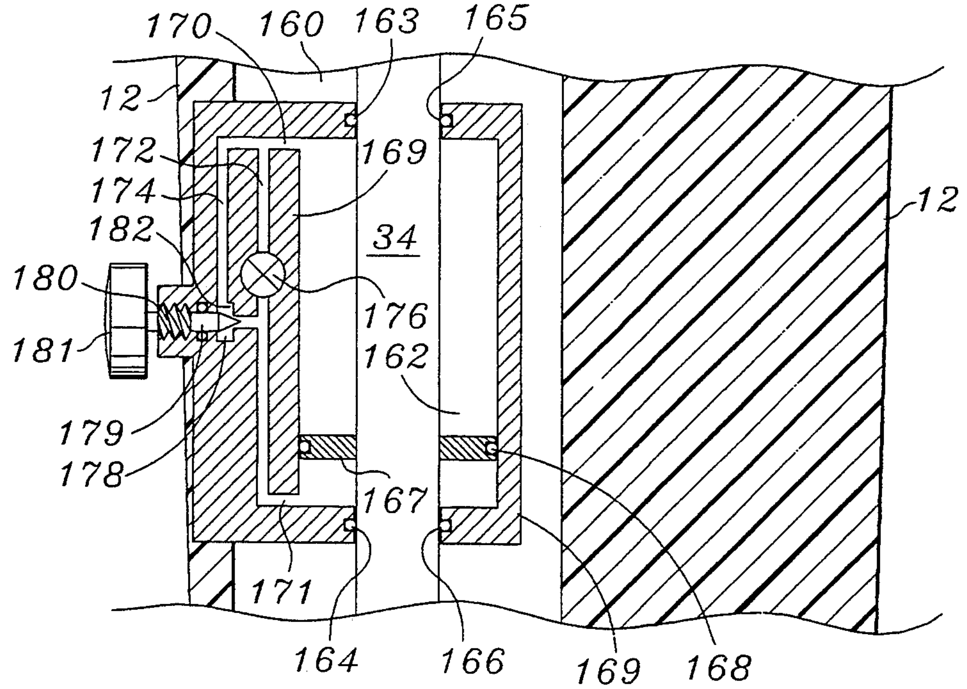
FIG. 10 illustrates another alternate form of the velocity governor comprising a viscous fluid dampener with an adjustable restriction.
Figure 11:
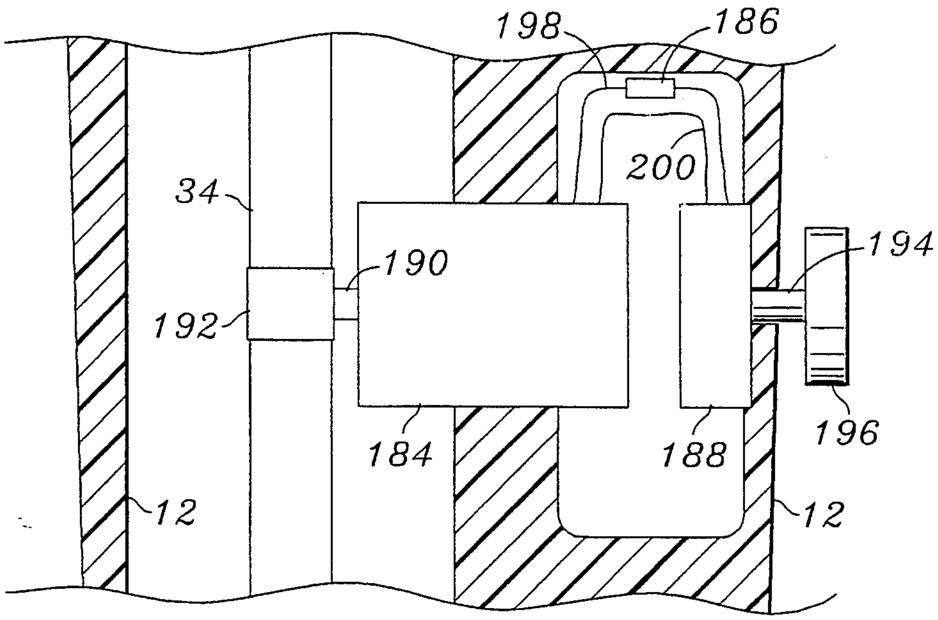
FIG. 11 illustrates still another alternate form of the velocity governor comprising an electric generator with a potentiometer.

Alternative forms of the velocity governor 30 are diagrammatically represented in FIGS. 9, 10 and 11. FIGS. 9 and 10 illustrate viscous fluid dampeners while an electromagnetic dampener is shown in FIG. 11. Referring now to FIG. 9, the dampener is represented generally by the numeral 120 and comprises a circular disk-shaped viscous fluid containing chamber 122 supported within the body 12 and having right and left coaxial extensions 124 and 126 having coaxial holes 128 and 130 therethrough. The hole 128 is internally threaded at 132 and receives a shaft 134 externally threaded at 136 to mate with the threads 132. The shaft 134 extends to the right outside the body 12 and is connected to an adjustment knob 138 for manually turning the shaft to adjust its axial position in the hole 128 and the axial position of a disk-shaped plate 140 carried by an opposite end of the shaft within the chamber 122. An O-ring seal 142 is seated around the shaft 134 adjacent the threads 132 to seal the shaft against the leakage of a viscous fluid 144 such as oil contained in this chamber. The hole 130 receives a shaft 146 which at its right end carries a disk-shaped plate 148 parallel to and facing the plate 140 within the chamber 122. An O-ring seal 150 is seated around the shaft 146 to seal the shaft against the leakage of the fluid 144 therearound. External to the extension 126, the shaft 146 is connected to one rotatable member of a conventional one way clutch 152, another rotatable member of the clutch being connected to a co-axial shaft 154 coupled to a roller or gear 156. The roller 156 rides on the outer surface of the plunger 34 and turns back and forth with vertical up and down movement of the plunger during operation of the pipette of the present invention. During downward movement of the plunger 34, the clutch 152 is disengaged and rotation is not coupled there through to the shaft 146. Upward movement of the plunger 34 however, produces an opposite turning of the roller 156 which is coupled through the clutch 152 to the shaft 146. The turning of the shaft 146 produces a turning of the plate 148 which is opposed by viscous friction forces on the faces of the plates 148 and 140. The smaller the adjusted spacing between the plates, the greater the viscous fluid friction forces and the greater the adjusted spacing, the less the viscous fluid friction forces in opposition to a turning of the shaft 146 and upward movement of the plunger 34 under the influence of the return spring 18. In this manner, a pipette user's turning of the adjustment knob 138 controls the viscous friction forces generated by the fluid dampener 120 of FIG. 9 to regulate the controlled rate of upward movement of the piston unit 16 in its return to the upper stop position for the pipette.

The viscous fluid dampener of FIG. 10 resembles somewhat the dashpot piston and velocity governor of FIG. 7 and is represented generally by the numeral 160. The dampener 160 comprises a viscous fluid containing cylinder 162 mounted within and secured to the pipette body 12. The cylinder 162 includes coaxial upper and lower openings 163 and 164 having O-ring seals 165 and 166 seated therein to axially receive and seal against the plunger 34. The plunger 34 carries a disk-shaped piston 167 having an O-ring seal 168 seated in its outer edge to seal and ride up and down on a cylindrical inner wall 169 of the cylinder 162 as the plunger moves up and down in the pipette. A left side of the cylindrical inner wall 169 of the cylinder 162, as depicted in FIG. 10, includes upper and lower side ports leading to passageways 170 and 171. The passageway 170 branches into vertical and parallel connecting passageways 172 and 174 between the upper and lower passageways. The passageway 172 connects to a fluid outlet from a conventional check valve 176. The passageway 174 leads to a conventional needle valve 178 having its threaded needle 179 located in a threaded side opening 180 in the pipette body 12 and secured at its outer end to an adjustment knob 181. The passageway 171 leads upward to a fluid inlet to the check valve 176 and branches into a seat 182 for the needle valve 178.

As with other velocity governors of the pipette of the present invention, viscous fluid dampener 160 regulates the controlled rate of upward movement of the plunger 34 from the "home" position to the upper stop position for the pipette. To provide such control, the pipette user simply turns the adjustment knob 181 to control the spacing of the needle 179 from the seat 182. In response to the downward movement of the plunger 34, the piston 167 forces the viscous fluid in the cylinder 162 into and upward through the passageway 171. The fluid will follow the path of least resistance and hence will flow relatively freely through the inlet to the open check valve 176 and into the passageway 172, returning to the cylinder 162 through the passageway 170. During such operation, the fluid dampener 160 exerts minimal resistance to the downward movement of the plunger from the upper stop position to the "home" position. In returning to the upper stop position, the dampener 160 exerts a controlled resistance on the plunger 34 in opposition to its upward movement. This is caused by the piston 167 forcing the viscous fluid upward in the cylinder 162 to flow through the passageway 170. Again, the fluid will follow the path of least resistance which is through the needle valve 178 since the check valve 176 is closed to downward flow of fluid through the passageway 172. The fluid restriction provided by needle valve 178 develops a controlled resistance to the flow of fluid therethrough and hence a controlled opposition to the upward movement of the piston 167 and plunger 34 within the cylinder 162. Such controlled opposition is reflected in a controlled rate of upward movement of the plunger between the "home" position and the upper stop position in the pipette.

The velocity governor illustrated in FIG. 11 provides a similar controlled rate of upward movement for the plunger 34. Generally speaking, the governor comprises an electric generator 184 in circuit with a diode 186 and a potentiometer 188 for developing a downward force on the plunger 34 in opposition to its upward movement between the "home" and upper stop positions. The generator 184 is a conventional small DC generator mounted within and secure to the pipette body 12 with its output shaft 190 secured to and carrying a roller or gear 192 for riding on and turning back and forth with up and down movement of the plunger 34. The windings of the generator 184 are connected by a lead 198 to a diode 186 and hence to one terminal of the potentiometer 188 and by a lead 200 to a second terminal of the potentiometer. The potentiometer 188 is of conventional design and is supported within and secured to the pipette body 12 with its adjustment shaft 194 extending from the body 12 to connect to a knob 196.

In operation, a pipette user adjusts the resistance presented by the potentiometer 188 by turning the knob 196 to a desired rotational position. Downward movement of the plunger 34 from the upper stop position to the "home" position produces a turning of the shaft 190 and rotor winding of the generator. But for the diode 186, a direct current would flow through the lead 200 to the potentiometer 188 and return to the generator. However, the diode 186 blocks such current flow. Under such conditions, the generator back emf does not generate a current which would otherwise develop and transmit through the shaft 190 and roller 192 a force in opposition to the downward movement of the plunger 34. In response to upward movement of the plunger 34 however, a back emf is generated by the generator which produces a current through the lead 198, diode 186 and potentiometer 188 returning to the generator to create a torque load which through the shaft 190 and roller 192 develops and exerts on the plunger a force in opposition to its upward movement from the "home" to upper stop positions. The magnitude of the force is a function of the resistance setting of the potentiometer 188 as controlled by the pipette user's turning the knob 196. Thus, the user can regulate the opposing force on the plunger and hence the rate of movement of the plunger in returning to its upper stop position.

Figure 12:
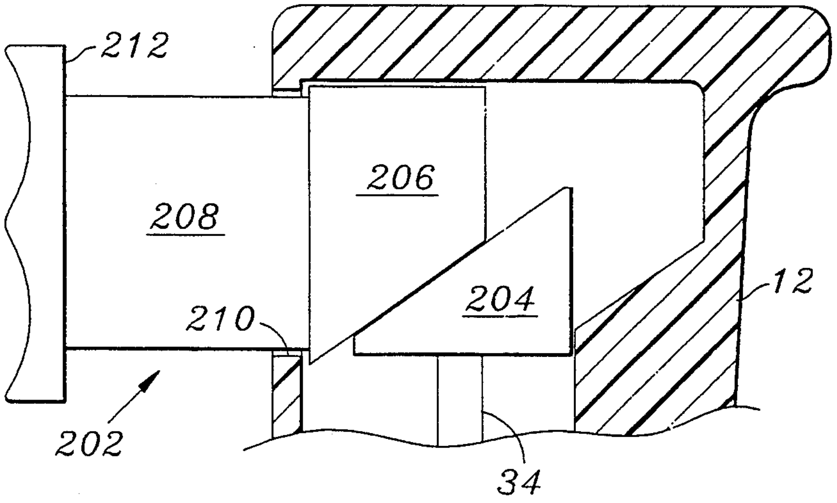
FIG. 12 illustrates an upper portion of an alternate form of the pipette of the present invention including a pistol grip for forefinger operation of a piston actuator and which translates horizontal movement of the actuator into vertical piston movement.

In the embodiments of the pipette of the present invention illustrated in FIGS. 1-6, downward movement of the plunger 34 is produced by the pipette user pressing down on the control knob 22 connected to the plunger. However, the present invention is not limited to such a construction or operation. Rather, the downward movement of the plunger 34 for example may be produced by a lateral or horizontal movement of an actuator 202 which may be translated into downward vertical movement of the plunger in opposition to the return spring 18. One example of such an actuator construction is illustrated in FIG. 12 where the upper end of the upwardly spring biased plunger 34 is connected to a triangularly shaped cam 204. A mating triangular cam 206 is carried by a push rod 208 extending laterally or horizontally through a side opening 210 in a top portion of the pipette body 12. The cam 206 is slightly larger than the opening 210 and in the upper stop position for the plunger 34 illustrated in FIG. 12, engages an inside surface of the top portion of the pipette body 12 to secure the cam within the body.

As illustrated, the top portion of the pipette body is shaped somewhat like a pistol grip with a finger piece 212 secured to an exposed end of the push rod 208 for finger gripping by a pipette user holding the top portion of the pipette body. By squeezing inwardly on the finger piece 212, the user slides the push rod 208 and cam 206 to the right. The cam 206 bears on the cam 204 to force the cam 204 and the plunger downwardly within the pipette body to move the plunger from its upper stop position to the "home" position in opposition to the return spring 18. Upon a release of the inward gripping force on the finger piece 212, and a release of any one of the previously described latching mechanisms included in the pipette, the plunger 34 will automatically return to its upper stop position under the influence of thee return spring and any one of the previously described velocity governors.

In view of the foregoing it should be appreciated that the preferred forms of the pipette of the present invention described and illustrated herein may be modified without departing from the spirit of the present invention and that the present invention is to be limited in scope only by the following claims. For example, the releasable latch and velocity governor features of the present invention are not limited to air displacement pipettes of the type described herein. Such features may be directly applied to conventional positive displacement pipettes wherein the "home" position could be at the lower or second stop position for the pipette.

We claim:

1. A manual pipette for repeatably aspirating and dispensing a predetermined quantity of a liquid, comprising:

a hand holdable pipette body;

plunger means mounted within the pipette body for manual movement by a pipette user away from a first stop position toward a home position, the home position being a predetermined starting position for the plunger means for repeatable aspiration of the predetermined quantity of liquid into a tip extending from the pipette body when the tip is immersed in the liquid;

spring means within the pipette body for generating a spring force opposing movement of the plunger means away from the first stop position and for returning the plunger means from the home position to the first stop position;

means within the pipette body and operative as the plunger means reaches the home position for introducing a user detectable change in a force opposing movement of the plunger means away from the first stop position to indicate to the pipette user that the plunger means has reached the home position; and latch means operative as the plunger means reaches the home position for releasably maintaining the plunger means in the home position and under control of the pipette user, whereby a release of the latch means with the tip extending from the pipette body immersed in the liquid will affect aspiration of the predetermined quantity of liquid into the tip with a return of the plunger means to the first stop position in response to the spring means.

2. The manual pipette of claim 1 further including means for releasing the latch means whereby the spring means causes the plunger to return to the first stop position.

3. The manual pipette of claim 2 wherein the means for releasing the latch means comprises user operable trigger means.

4. The pipette of claim 1 or claim 2 further comprising velocity governing means operative upon a release of the latch means for controlling the rate at which the spring means returns the plunger means from the home position to the first stop position during aspiration of liquid by the pipette.

5. The pipette of claims 1 or 2 further comprising means for selectively overriding the latch means.

6. The pipette of claim 4 wherein the velocity governing means comprises dashpot means within the pipette body including a dashpot piston for moving toward the first stop position with the plunger means at a velocity regulated by an adjustable restriction in an air path into the dashpot means.

7. The pipette of claim 4 wherein the velocity governing means comprises a viscous fluid dampener including a member for moving in a viscous fluid containing chamber in response to movement of the plunger means toward the first stop position.

8. The pipette of claim 7 wherein the member comprises a first plate secured to a shaft for turning in the chamber in response to upard movement of the plunger means from the "home" position to the first stop position and having a user adjustable second plate on a hand turnable shaft facing and spaced from the first plate such that a turning of the hand turnable shaft changes the spacing of the first and second plates and fluid friction therebetween.

9. The pipette of claim 7 wherein the member comprises a piston on the plunger for moving in a viscous fluid containing chamber and upper and lower passageways from and returning to the chamber, a check valve in a first connecting passageway between the lower and upper passageways for passing fluid as the piston moves downward in the chamber with the plunger and an adjustable restriction in a second connecting passageway between the upper and lower passageways for passing fluid as the piston moves upwardly in the chamber with the plunger.

10. The pipette of claim 4 wherein the velocity governing means comprises electric generator means and a unidirectional current valve and user adjustable potentiometer in circuit therewith, the electric generator means comprising an output shaft for turning in response to movement of the plunger means to generate a current creating a torque load opposing a turning of the output shaft during movement of the plunger means toward the first stop position to regulate the rate of return of the plunger means from the "home" position to the first stop position.

11. The pipette of claim 1 or claim 2 wherein the latch means comprises a magnetic latch including a first member moveable with the plunger means relative to a second member for engaging and releasably locking by magnet attraction to the second member when the first member and plunger means reach the "home" position.

12. The pipette of claim 11 wherein the first member is hand turnable with the plunger means to align with and releasably lock to the second member in the "home" position and to turn relative to the second member to release therefrom.

13. The pipette of claim 11 wherein the first member comprises a dashpot piston on the plunger means for riding in a cylinder in the pipette body to define dashpot means and the second member comprises a magnet and the pipette further includes a user controllable air restriction into the dashpot means.

14. The pipette of claim 11 wherein the means for releasing the latch means comprises a cam for engaging and moving the plunger means to release the first member from the second member and thereby allow the plunger means to return to the first stop position in response to the spring means.

15. The pipette of claim 2 wherein the latch means and means for releasing the latch means comprises a user moveable spring loaded slide extending into the pipette body and carrying a latch hinged to the slide and connected to a spring secured to the pipette body for engaging a catch on the plunger means and swinging against the spring as the plunger reaches the "home" position to releasably lock the plunger means against return to the first stop position.

16. A method of aspirating a predetermined quantity of a liquid with a hand holdable pipette body containing plunger means moveable away from a first stop position against a return force exerted by a spring means to a home position, the home position being the plunger means starting position for repeatable aspiration of the predetermined quantity of liquid into a tip extending from the pipette when the tip is immersed in the liquid, the method comprising:

- manually moving the plunger means away from the first stop position against the force of the spring means;
- detecting the home position for the plunger means during movement of the plunger means away from the first stop position;
- latching the plunger means in the home position with a latch operable as the plunger means reaches the home position to releasably maintain the plunger means in the home position without any user exerted force on the plunger means in opposition to the force of the spring means;
- inserting a tip extending from the pipette into the liquid while the latch maintains the plunger means in the home position; and
- releasing the latch to permit the spring means to return the plunger means from the home position to the first stop position and to aspirate the predetermined quantity of liquid into the tip.

17. A manual pipette for repeatably aspirating and dispensing a predetermined quantity of a liquid, comprising:

- a hand holdable pipette body;
- plunger means mounted within the pipette body for manual movement by a pipette user away from a first stop position toward a home position, the home position being a predetermined starting position for the plunger means for repeatable aspiration of the predetermined quantity of liquid into a tip extending from the pipette body when the tip is immersed in the liquid;
- spring means within the pipette body for generating a spring force opposing movement of the plunger means away from the first stop position and for returning the plunger means from the home position to the first stop position;
- means including a first member within the pipette body and operative as the plunger means reaches the home position for introducing a user detectable change in a force opposing movement of the plunger means away from the first stop position to indicate to the pipette user that the plunger means has reached the home position; and latch means operative as the plunger means reaches the home position for releasably maintaining the plunger means in the home position and under control of the pipette user, the latch means comprising a second member moveable with the plunger means and the first member of the means for introducing a user detectable change in the force opposing movement of the plunger means, one of the first and second members including a magnet for magnetically attracting and releasably locking to the other of the members as the plunger means reaches the home position, whereby a release of the latch means with the tip extending from the pipette body immersed in the liquid will affect aspiration of the predetermined quantity of liquid into the tip with a return of the plunger means to the first stop position in response to the spring means.

18. The manual pipette of claim 17 wherein the second member comprises a dashpot piston secured for axial movement with the plunger means within a dashpot cylinder mounted within the pipette body and the first member is carried by a bottom member for the dashpot cylinder, the dashpot piston and cylinder defining a governor for controlling the rate at which the piston means returns from the home position to the first stop position during aspiration of the liquid by the pipette.

19. The manual pipette of claim 18 wherein the means for introducing the user detectable change in the force opposing movement of the plunger means comprises:

the bottom member of the dashpot cylinder, the bottom member being moveable within an end of the dashpot cylinder, and a second spring means for continuously urging the bottom member into the end of the dashpot cylinder, whereby upon a releasable locking of the first and second members a continued movement of the plunger means causes the bottom member to move with the plunger means against the second spring means.

* * * * *